United States Patent
Fries et al.

(10) Patent No.: US 6,454,823 B2
(45) Date of Patent: Sep. 24, 2002

(54) AIR FILTER HOUSING HAVING A DEFLECTION BOWL

(75) Inventors: Uwe Fries, Waiblingen; Markus Hägele, Auenwald; Maximilian Eberhardt, Esslingen; Jürgen Häberlein, Murrhardt, all of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/823,545

(22) Filed: Mar. 30, 2001

(30) Foreign Application Priority Data

Apr. 1, 2000 (DE) .......................................... 100 16 430

(51) Int. Cl.[7] .............................................. B01D 35/30
(52) U.S. Cl. ..................... 55/385.3; 55/413; 55/DIG. 28
(58) Field of Search ............................... 55/320, 385.3, 55/413, 414, DIG. 28; 123/198 E

(56) References Cited

U.S. PATENT DOCUMENTS 3,856,490 A * 12/1974 Heintzelman ............. 123/73 R
4,600,418 A    7/1986 Gommel et al.
4,838,909 A *  6/1989 Bidanset ..................... 55/385.7
5,503,649 A *  4/1996 Nickel ..................... 123/198 E

* cited by examiner

Primary Examiner—Robert A. Hopkins
(74) Attorney, Agent, or Firm—R W Becker & Associates; R W Becker

(57) ABSTRACT

An air filter housing is provided for an intake air filter for a carburetor of an engine. A clean air receiving chamber is formed in the filter housing and is delimited by a filter element. Opening into the clean air receiving chamber is an intake opening that connects the air filter to the intake channel of the carburetor. A hood-like deflection bowl covers the intake opening in the clean air receiving chamber. The peripheral wall of the deflection bowl has a communicating window disposed transverse to the intake channel and serving for flow connection to the clean air receiving chamber. The communicating window opens into a compensation chamber that is separated from the clean air receiving chamber and communicates therewith via a channel.

9 Claims, 3 Drawing Sheets

AIR FILTER HOUSING HAVING A DEFLECTION BOWL

BACKGROUND OF THE INVENTION

The present invention relates to an air filter housing with an intake air filter for the mixture formation device of an internal combustion engine, especially for the carburetor of a two or four stroke engine. Formed in the filter housing is a clean air receiving chamber that is delimited by a filter element. An intake opening opens into the clean air receiving chamber for establishing communication of the intake air filter to the intake channel of the mixture formation device. A deflection bowl covers the intake opening in a hood-like manner. Provided in the peripheral wall of the deflection bowl is a communicating window that is disposed transverse to the intake channel and serves for the flow communication with the clean air receiving chamber.

U.S. Pat. No. 4,600,416 discloses an intake air filter where the filter housing is essentially composed of two housing halves. The lower portion of the filter housing forms a baffle or deflection bowl that spans the intake opening in the filter housing in an essentially hood-like manner; provided in the peripheral wall of the deflection bowl is a communicating window to the clean air receiving chamber of the intake air filter.

This known intake air filter was intended to keep the fuel portion of the intake air that pulsates back away from the filter element, so that the filter element could reliably fulfill its function over a long period of operation. However, it was discovered in practice that under unfavorable operating conditions, intake air saturated with fuel could flow back into the clean air receiving chamber of the air filter via the communicating window, whereby this fuel becomes deposited in the air filter element. This increases the resistance to flow of the filter surface, bringing about a loss in efficiency of the associated internal combustion engine. In addition, the filter element becomes dirty more quickly, and must be cleaned more frequently.

It is therefore an object of the present invention to improve an intake air filter of the aforementioned general type in such a way that even under unfavorable operating conditions entry of mixture-saturated intake air into the clean air receiving chamber of the air filter is prevented.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
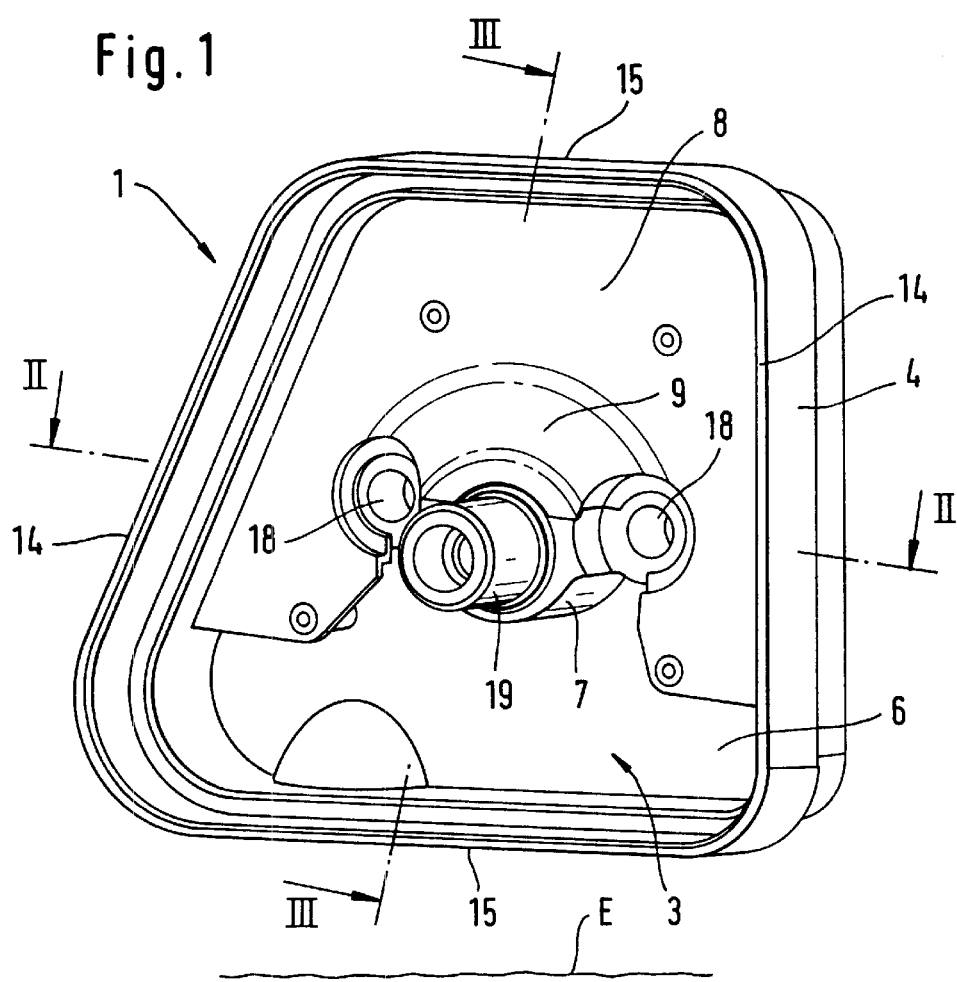
FIG. 1 is a perspective view of one exemplary embodiment of an inventive intake air filter with the filter element removed.

The air filter housing of the present invention is characterized primarily in that the communicating window opens into a compensation chamber that is separated from the clean air receiving chamber, with the compensation chamber communicating with the clean air receiving chamber by means of a channel.

The basic concept of the present invention is to not allow the communicating window to open directly into the clean air receiving chamber of the air filter housing, but rather to provide a compensation chamber in the flow path between the communicating window and the clean air receiving chamber; the compensation chamber, in turn, is in communication with the clean air receiving chamber of the air filter housing by means of at least one channel-like connection. To a large extent, the compensation chamber accommodates the volume of mixture of saturated intake air that pulsates back, so that structurally a passing of the mixture saturated intake air over into the clean air receiving chamber is prevented. Preferably, a coordination of the volumes is provided such that the sum of the volumes of the compensation chamber and the channel correspond approximately to the volume of intake air that pulsates back, although such sum is preferably greater than this volume.

Due to the multiple deflection of the intake air that pulsates back, the droplets of liquid of the mixture are deposited on the walls of the compensation chamber and of the channel and, under the effect of the force of gravity in the intake air flow, such droplets are returned via the communicating window into the deflection bowl and are drawn along in during the intake stroke. In this connection, the communicating window faces away from the ground, in other words, faces the active force of gravity.

The channel preferably branches off at that end of the compensation chamber that is opposite the communicating window, so that a flow path is obtained that is as long as possible and that ensures a retention of mixture laden intake air. The direction of flow in the compensation chamber is directed opposite to the force of gravity; the direction of flow is turned by 180° relative to the channel.

Pursuant to another specific embodiment of the present invention, a baffle or deflection wall is disposed in the compensation chamber. The deflection wall extends transverse to the flow through direction of the intake air and reinforces the deposition effect of the liquid droplets out of the intake air that pulsates back. In one specific embodiment, the deflection wall is curved relative to the communicating window so that the intake air that is flowing in flows against the convex side of the deflection wall, which has a low resistance to flow. In the opposite direction, the intake air that pulsates back flows against the concave side of the deflection wall and collects in the curvature thereof; the resistance to flow from the communicating window to the channel is structurally greater.

The partition that delimits the compensation chamber and the channels is preferably spaced from the filter element so that a large effective filter surface is provided for the intake air that is flowing through; this enables a long operational time without having to clean the filter element.

Further specific features of the present invention will be provided in detail subsequently.

DESCRIPTION OF PREFERRED EMBODIMENTS

Figure 2:
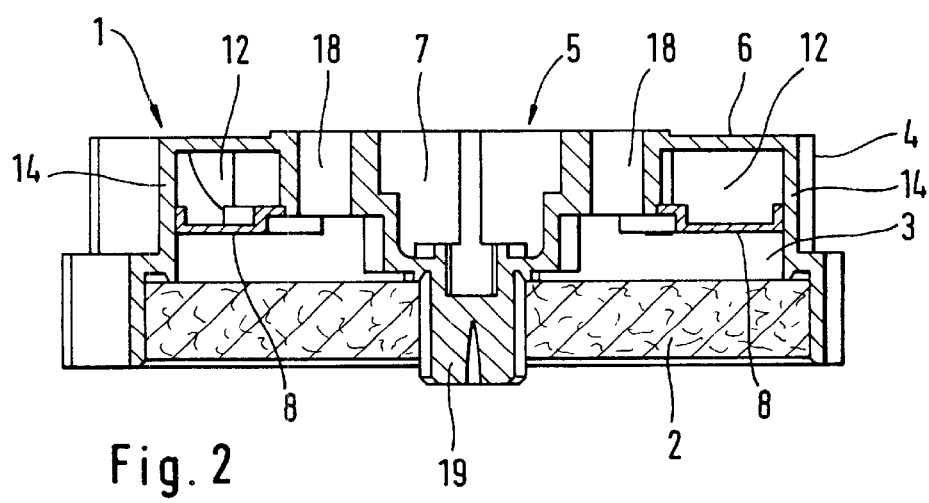
FIG. 2 is a cross-sectional view taken along the line II—II in FIG. 1 and showing an inserted filter element.
Figure 3:
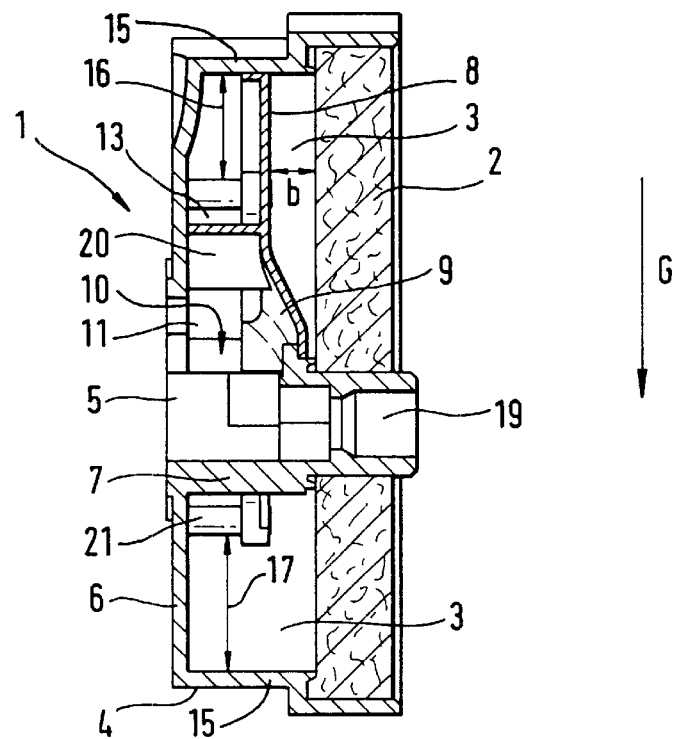
FIG. 3 is a cross-sectional view taken along the line III—III in FIG. 1 and showing an inserted filter element.

Referring now to the drawings in detail, the intake air filter illustrated in FIG. 1, and which is intended for a mixture formation device, such as a carburetor, of an internal combustion engine, essentially comprises a filter housing 1 in which is formed a clean air receiving chamber 3 that is delimited by a filter element 2 (see FIGS. 2 and 3). In the illustrated embodiment, the filter housing 1 is comprised of a cup-shaped base housing member 4 that is closed off by the filter element 2. This filter element 2 is expediently fixed on the cup-shaped housing member 4 by means of a non-illustrated cover.

Figure 4:
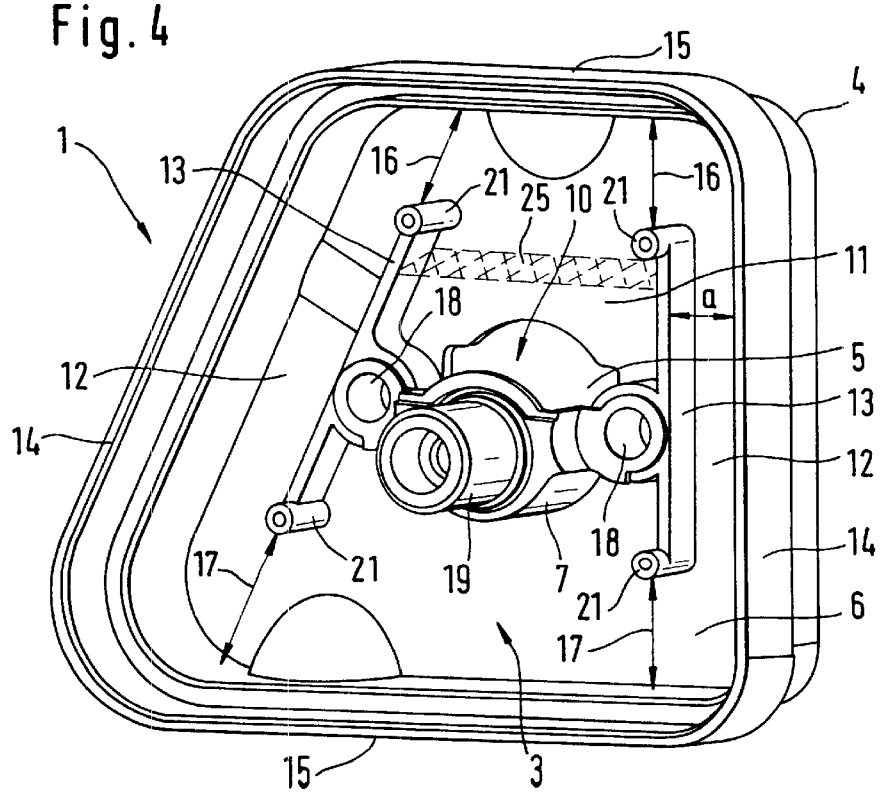
FIG. 4 is a perspective view similar to that of FIG. 1 with the partition removed.
Figure 5:
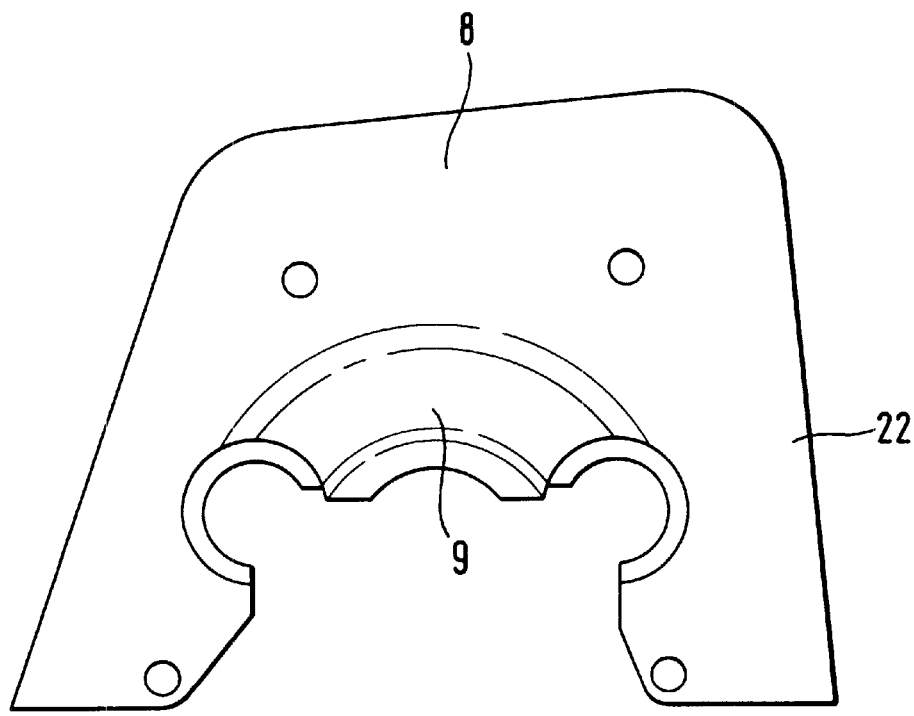
FIG. 5 is a view of the partition illustrated in FIG. 1.

As can be seen from FIGS. 2, 3 and 4, provided approximately centrally in the base 6 of the base housing member 4 is an intake opening 5 that serves for connecting the intake air filter with the intake channel of a mixture formation device of an internal combustion engine. Such a mixture formation device is, for example, the carburetor, especially the diaphragm carburetor of a two or four stroke engine, such as is provided as the drive motor in manually guided, portable implements, such as a power chain saw, a brush cutter, a hedge trimmer, a cut-off machine, a blower, or the like.

The intake opening 5 is substantially entirely spanned by a hood-like baffle or deflection bowl 7; in the illustrated embodiment, the deflection bowl 7 is supplemented by a hood portion 9 of a partition or separating wall 8 that is disposed in the clean air receiving chamber 3. The deflection bowl 7 is substantially closed over its periphery and, as shown in particular in FIGS. 3 and 4, communicates with the clean air receiving chamber 3 by means of a communicating window 10 that is disposed in a peripheral wall of the bowl 7. For this purpose, the communicating window 10 initially opens out into a compensation chamber 11 (see FIG. 4), which in turn is in flow communication with the clean air receiving chamber 3 of the intake air filter via elongated channels 12. The communicating window 10 faces the active force of gravity G. The prevailing operating position of the intake air filter is such that the communicating window 10 faces away from the ground E.

The compensation chamber 11 is formed between the housing base 6, which is provided with the intake opening 5, and the partition 8, which is disposed in the clean air receiving chamber 3. The compensation chamber 11 is delimited on the one hand by the housing base 6 and the partition 8, and on the other hand by the deflection bowl 7 as well as ribs or elements 13 that in the illustrated embodiment extend at a distance "a" in the longitudinal direction next to side walls 14 of the filter housing 1 that are disposed approximately parallel to the force of gravity G. The elements 13 end at a distance or spacing 16, 17 from the transverse housing walls 15, so that at their end having the spacing 16 a flow connection is provided to the compensation chamber 11, and at their end having the spacing 17 a flow connection is provided to the clean air receiving chamber 3. The channel 12 has a preferably uniform cross-sectional configuration over its length; it can, however, be advantageous to widen the channel 12 in the direction of flow 23 (FIG. 6) to the communicating window 10.

In the illustrated embodiment, the elements 13, the deflection bowl 7, and the housing base 6 of the filter housing 1 are produced as a single piece, being made in particular of polymeric material or light weight metal such as magnesium. The deflection bowl 7 is connected via respective screw domes 18 to the elements 13, so that that end of the compensation chamber 11 that is provided with the deflection bowl 7 is completely closed off relative to the clean air receiving chamber 3. Flow communication between the compensation chamber 11 and the clean air receiving chamber 3 is effected exclusively by means of the elongated channels 12.

In the region of the elements 13 and the compensation chamber 11, the partition 8 essentially entirely covers the housing base 6, as shown in FIG. 1. Merely in the region of those ends of the elements 13 that are disposed at the spacing 17 relative to the transverse housing wall 15 is the housing base 6 exposed.

As shown in FIGS. 2 and 3, the partition 8 is spaced from the filter element 2 by the distance "b". This ensures that intake air can flow to and over the entire surface of the filter element 2, thus evenly distributing any dirt over the filter surface.

The filter element 2 itself has a cylindrical dome 19 extending through it; this dome can be utilized for the securement of a non-illustrated cover or the like.

The arrangement and configuration of the compensation chamber 11 as well as of the elongated channels 12 are essentially symmetrical to an axis of symmetry provided by the section line II—II in FIG. 1. The intake opening 5 is substantially disposed on the axis III—III (FIG. 1) in the housing base 6; in the view of FIG. 4 from the front, the housing elements 13 are disposed on both sides of the intake opening 5 and deflection bowl 7, so that the compensation chamber 1 1 communicates with the clean air receiving chamber 3 by means of two channels 12 that extend essentially parallel to the housing side walls 14, i.e. to the force of gravity G.

Figure 6:
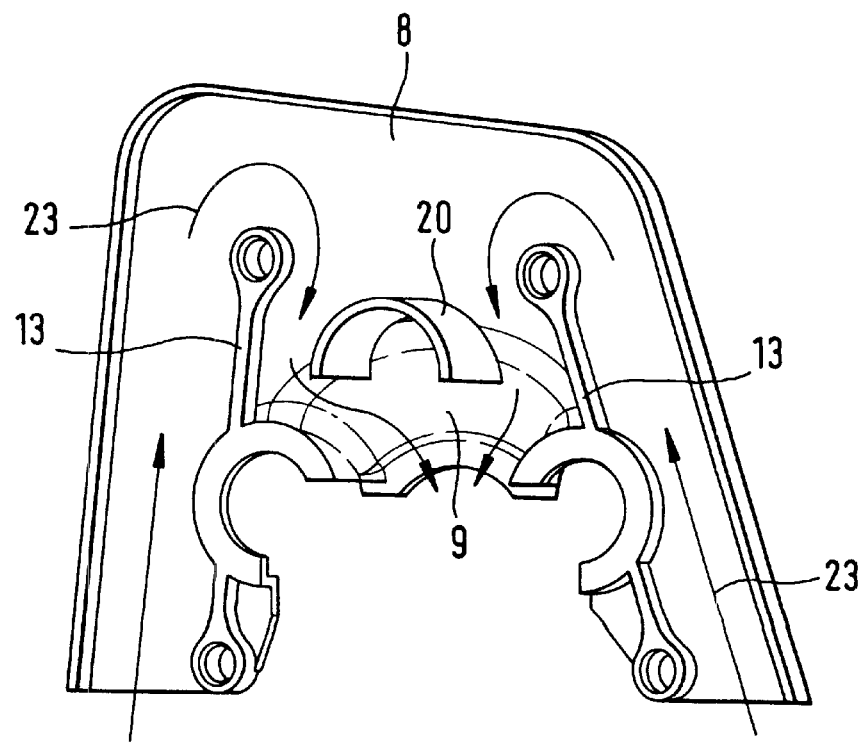
FIG. 6 is a perspective view of the partition seen from the base of the housing for the air filter.

Pursuant to a further specific embodiment of the present invention, a baffle or deflection wall 20 is provided in the compensation chamber 11; this deflection wall, as shown in FIGS. 3 and 6, is disposed approximately centrally between the elements 13 and is curved in a direction facing the communicating window 10. The deflection wall 20 extends over the entire height of the compensation chamber 11 from the partition 8 to the housing base 6. The deflection wall 20 is convexly curved in the direction of flow 23 of the drawn-in air for combustion (see FIG. 6) so that the air for combustion that is flowing in encounters as little resistence to flow as possible. Gases that pulsate back out of the communicating window 10 in to the compensation chamber 11 are caught in the curvature of the deflection wall 20, in other words, are prevented from exiting the compensation chamber 11 into the elongated channels 12. The resistance to flow out of the compensation chamber 11 into the elongated channels 12 is greater than in the direction of flow 23 of the drawn-in air for combustion. In the intake direction, the resistance to flow is thus less than in the opposite direction.

In order to ensure a symmetrical distribution of flow, the deflection wall 20 is disposed approximately centrally in the compensation chamber 11, so that its ends are respectively laterally spaced from the elements 13 and a respective flow path is formed between the elements and the ends of the deflection wall 20, as shown by the arrows depicting the direction of flow 23.

It can be advantageous to form the elements 13 on the housing base 6 over the entire height of the elements; in the illustrated embodiment, as shown in FIG. 6, part of the height of the elements 13 is formed on the partition 8. The ends of the elements 13, as can be seen from FIGS. 4 and 6, are formed by domes 21, as a result of which the resistance to flow is reduced due to the rounded ends of the elements 13. The partition 8 is fixed in the filter housing I via the four fastening or screw domes 21, and in addition is secured to the dome 18 by two nuts and bolts. The rim 22 of the partition 8 is disposed on the housing side walls 14 and the upper transverse housing wall 15 in a manner essentially free of play. An air tight connection is not necessary; leakage can be permitted.

In order to obtain a good sealing, and to increase the rigidity and stability of the partition 8, which is made of polymeric material, the outer rim 22 of the partition 8 is angled off so as to be substantially perpendicular to the plane of the partition. The height of the rim 22 is such that an appropriate, adequate sealing is achieved in the filter housing 1.

In addition to or instead of the deflection wall 20, the communicating window 10 can be covered by a grating in the form of a screen 25 (see FIG. 4). It is sufficient to dispose the grating or screen 25 in the flow path to or through the communicating window 10 in such a way that the drawn-in intake air, or the intake air that pulsates back, must flow through the grating. In FIG. 4, such a grating, which is embodied as the screen 25, is illustrated by cross-hatching.

The specification incorporates by reference the disclosure of German priority document 100 16 430.7 of Apr. 1, 2000.

The present invention is, of course, in no way restricted to the specific disclosure of the specification and drawings, but also encompasses any modifications within the scope of the appended claims.

What we claim is:

1. An air filter housing for an intake air filter for a mixture formation device of an internal combustion engine, and comprising:

a filter element disposed in said air filter housing, wherein said filter element delimits a clean air receiving chamber in the air filter housing, and wherein to establish communication between said air intake filter and an intake channel of said mixture formation device, said air filter housing is provided with an intake opening that opens into said clean air receiving chamber; and a deflection bowl that covers said intake opening in a hood-like manner, wherein a peripheral wall of said deflection bowl is provided with a communicating window that is disposed transverse to said intake channel and serves for flow communication of said intake opening with said clean air receiving chamber, wherein said air filter housing is provided with a compensation chamber that is separated from said clean air receiving chamber and into which said communicating window opens, and wherein channel means are provided for establishing communication between said compensation chamber and said clean air receiving chamber.

2. An air filter housing according to claim 1, wherein said channel means is branched at an end of said compensation chamber that is disposed opposite said communicating window.

3. An air filter housing according to claim 1, wherein said compensation chamber is formed between a base of said housing that is provided with said intake opening, and a partition that is disposed in said clean air receiving chamber.

4. An air filter housing according to claim 3, wherein said compensation chamber is delimited by said deflection bowl as well as elements that are disposed on opposite sides of said housing.

5. An air filter housing according to claim 4, wherein at least one of said elements is spaced from a side wall of said housing and together with said side wall delimits said channel means.

6. An air filter housing according to claim 5, wherein a deflection wall is disposed in said compensation chamber and extends transverse to a flow through direction of intake air.

7. An air filter housing according to claim 6, wherein said deflection wall is spaced from said communicating window and is curved so as to open toward said communicating window.

8. An air filter housing according to claim 6, wherein said deflection wall is laterally spaced from said elements.

9. An air filter housing according to claim 3, wherein said partition is spaced from said filter element.

* * * * *